(12) United States Patent
Morselli

(10) Patent No.: US 10,028,446 B2
(45) Date of Patent: Jul. 24, 2018

(54) AUXILIARY POWER SYSTEM FOR AN AGRICULTURAL BALER WITH FEEDFORWARD CONTROL

(71) Applicant: CNH Industrial America LLC, New Holland, PA (US)

(72) Inventor: Riccardo Morselli, Modena (IT)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/481,892

(22) Filed: Apr. 7, 2017

(65) Prior Publication Data

US 2017/0290272 A1    Oct. 12, 2017

(30) Foreign Application Priority Data

Apr. 8, 2016   (BE) .................................. 2016/5244

(51) Int. Cl.
    *A01F 15/08*    (2006.01)
    *A01D 69/02*    (2006.01)
    *B30B 9/30*    (2006.01)

(52) U.S. Cl.
    CPC .......... *A01F 15/0841* (2013.01); *A01D 69/02* (2013.01); *B30B 9/3007* (2013.01)

(58) Field of Classification Search
    CPC ... A01F 15/0841; B30B 9/3007; B30B 9/305; A01D 69/02; A01D 69/002; A01D 69/025
    See application file for complete search history.

(56) References Cited

U.S. PATENT DOCUMENTS

| | | | | |
|---|---|---|---|---|
| 3,139,969 A | * | 7/1964 | Sullivan | ............... A01D 87/125 100/188 BT |
| 2003/0159421 A1 | * | 8/2003 | Trelstad | .............. A01F 15/0841 56/341 |
| 2003/0167939 A1 | * | 9/2003 | Roth | ................... A01F 15/0841 100/342 |

(Continued)

FOREIGN PATENT DOCUMENTS

| | | | | |
|---|---|---|---|---|
| CA | 2252046 A1 | * | 9/1999 | ........... A01F 15/042 |
| EP | 2183955 A1 | * | 5/2010 | ......... A01D 41/1274 |

(Continued)

*Primary Examiner* — John Weiss
(74) *Attorney, Agent, or Firm* — Peter K. Zacharias; Patrick M. Sheldrake

(57) ABSTRACT

An agricultural baler includes a main bale chamber and a plunger reciprocally movable within the main bale chamber. The plunger has a duty cycle. A flywheel is associated with the movement of the plunger, and a driveline is associated with the flywheel and couplable with a power take-off of a traction unit. The baler is characterized by an auxiliary power system coupled with the driveline. The auxiliary power system includes a power indicator providing a plurality of output signals, each representing a parameter associated with power usage during the duty cycle of the plunger. A power device receives power from or transfers power to the driveline. An electrical processing circuit is coupled with the power indicator and the power device. The electrical processing circuit receives each output signal and controls operation of the power device, based on at least one output signal from at least one previous duty cycle.

17 Claims, 10 Drawing Sheets

(56) References Cited

U.S. PATENT DOCUMENTS

| | | | |
|---|---|---|---|
| 2008/0127839 A1* | 6/2008 | Fahrenbach | B30B 1/14 |
| | | | 100/214 |
| 2010/0108413 A1* | 5/2010 | Lang | A01F 15/0841 |
| | | | 180/53.1 |
| 2013/0152805 A1* | 6/2013 | Roth | A01F 15/0841 |
| | | | 100/35 |
| 2014/0137757 A1* | 5/2014 | Nelson | A01F 15/0841 |
| | | | 100/102 |
| 2016/0000012 A1 | 1/2016 | Bonte et al. | |
| 2017/0244300 A1* | 8/2017 | Ben David | H02K 7/025 |

FOREIGN PATENT DOCUMENTS

| | | | | |
|---|---|---|---|---|
| WO | WO-2014128097 A1 * | 8/2014 | | A01F 15/0841 |
| WO | 2016005334 A1 | 1/2016 | | |
| WO | 2016005366 A1 | 1/2016 | | |
| WO | 2016005388 A1 | 1/2016 | | |

* cited by examiner

AUXILIARY POWER SYSTEM FOR AN AGRICULTURAL BALER WITH FEEDFORWARD CONTROL

CROSS REFERENCE TO RELATED APPLICATION

This application claims priority to Belgium Application No. 2016/5244 filed Apr. 8, 2016, the contents of which are incorporated herein by reference.

BACKGROUND OF THE INVENTION

Field of the Invention

The present invention relates to agricultural balers, and, more particularly, to systems for powering such balers.

Description of the Related Art

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

On a large square baler, a pickup unit at the front of the baler gathers the cut and windrowed crop material from the ground. The pickup unit includes a pickup roll, and optionally may include other components such as side shields, stub augers, wind guard, etc.

A packer unit is used to move the crop material from the pickup unit to a duct or pre-compression chamber. The packer unit forms a wad of crop within the pre-compression chamber which is then transferred to a main bale chamber. (For purposes of discussion, the charge of crop material within the pre-compression chamber will be termed a "wad", and the charge of crop material after being compressed within the main bale chamber will be termed a "flake"). Typically such a packer unit includes packer tines or forks to move the crop material from the pickup unit into the pre-compression chamber. Instead of a packer unit it is also known to use a rotor cutter unit which chops the crop material into smaller pieces.

A stuffer unit transfers the wad of crop material in charges from the pre-compression chamber to the main bale chamber. Typically such a stuffer unit includes stuffer forks which are used to move the wad of crop material from the pre-compression chamber to the main bale chamber, in sequence with the reciprocating action of a plunger within the main bale chamber.

In the main bale chamber, the plunger compresses the wad of crop material into flakes to form a bale and, at the same time, gradually advances the bale toward the outlet of the bale chamber. The plunger reciprocates, back and forth, toward and away from the discharge end of the baler. The plunger may include a number of rollers which extend laterally outward from the sides of the plunger. The rollers on each side of the plunger are received within a respective plunger slot formed in the side walls of the bale chamber, with the plunger slots guiding the plunger during the reciprocating movements.

When enough flakes have been added and the bale reaches a full (or other predetermined) size, a number of knotters are actuated which wrap and tie twine, cord or the like around the bale while it is still in the main bale chamber. The twine is cut and the formed baled is ejected out the back of the baler as a new bale is formed.

During a compression cycle of the plunger as described above, the plunger moves through a compression stroke as it advances into the main bale chamber, with the highest load on the plunger occurring at the end of each compression stroke. As balers become increasingly larger, the peak loads on the plunger during compression strokes likewise become increasingly larger. One way to compensate for these higher peaks loads is to use a larger flywheel coupled with a gearbox which drives the plunger. As the plunger reaches the end of the compression stroke, the momentum of the heavier flywheel helps carry the plunger through the peak load at the end of the compression stroke. If the flywheel is not heavy enough then high loads are transferred back through the driveline to the base unit, which can result in lugging down of the engine onboard the base unit. However, a flywheel which is too large is also undesirable since it typically requires a base unit with a larger horsepower (HP) rating to start and drive the flywheel forming part of the driveline of the baler.

What is needed in the art is an agricultural baler which accommodates large peak loads during compression strokes of the plunger.

SUMMARY OF THE INVENTION

The present invention provides an agricultural baler with an auxiliary power system (APS) which scavenges power from and transmits power back to the driveline of the baler, using a feedforward control algorithm to optimize power requirements of the baler.

The invention in one form is directed to an agricultural baler including a main bale chamber and a plunger reciprocally movable within the main bale chamber through a compression stroke and a return stroke. The plunger has a duty cycle with a maximum power requirement, a minimum power requirement, and an average power requirement over the duty cycle. A flywheel is associated with the movement of the plunger, and a driveline is associated with the flywheel and couplable with a power take-off (PTO) of a traction unit. The baler is characterized by an auxiliary power system coupled with the driveline. The auxiliary power system includes a power indicator providing a plurality of output signals, with each said output signal representing a parameter associated with power usage during the duty cycle of the plunger. A power device receives power from and/or transfers power to the driveline. An electrical processing circuit is coupled with the power indicator and the power device. The electrical processing circuit is operable for receiving each output signal and controlling operation of the power device, based on at least one output signal from at least one previous duty cycle.

An advantage of the present invention is that power requirements for the baler are optimized, based on information from previous compression/duty cycles of the plunger.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
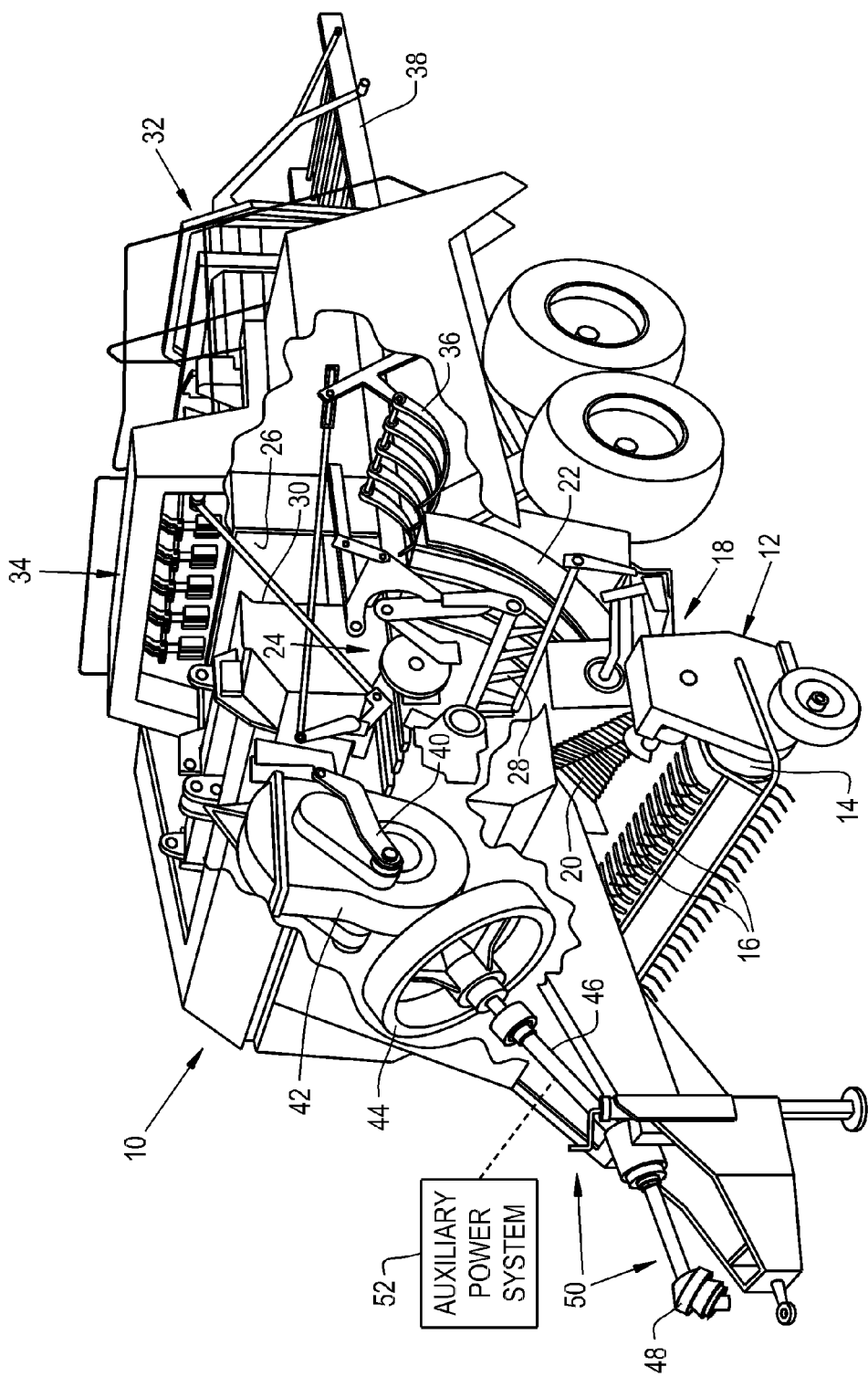
FIG. 1 is a perspective cutaway view showing the internal workings of a large square baler, which may include an APS of the present invention.

Referring now to the drawings, and more particularly to FIG. 1, there is shown a perspective cutaway view showing the internal workings of a large square baler 10. Baler 10 operates on a two stage feeding system. Crop material is lifted from windrows into the baler 10 using a pickup unit 12. The pickup unit 12 includes a rotating pickup roll 14 with tines 16 which move the crop rearward toward a packer unit 18. An optional pair of stub augers (one of which is shown, but not numbered) are positioned above the pickup roll 14 to move the crop material laterally inward. The packer unit 18 includes packer tines 20 which push the crop into a pre-compression chamber 22 to form a wad of crop material. The packer tines 20 intertwine the crop together and pack the crop within the pre-compression chamber 22. Pre-compression chamber 22 and packer tines 20 function as the first stage for crop compression. Once the pressure in the pre-compression chamber 22 reaches a predetermined sensed value, a stuffer unit 24 moves the wad of crop from the pre-compression chamber 22 to a main bale chamber 26. The stuffer unit 24 includes stuffer forks 28 which thrust the wad of crop directly in front of a plunger 30, which reciprocates within the main bale chamber 26 and compresses the wad of crop into a flake. Stuffer forks 28 return to their original stationary state after the wad of material has been moved into the main bale chamber 26. Plunger 30 compresses the wads of crop into flakes to form a bale and, at the same time, gradually advances the bale toward outlet 32 of main bale chamber 26. Main bale chamber 26 and plunger 30 function as the second stage for crop compression. When enough flakes have been added and the bale reaches a full (or other predetermined) size, knotters 34 are actuated which wrap and tie twine around the bale while it is still in the main bale chamber 26. Needles 36 bring the lower twine up to the knotters 34 and the tying process then takes place. The twine is cut and the formed bale is ejected from a discharge chute 38 as a new bale is formed.

Plunger 30 is connected via a crank arm 40 with a gear box 42. Gear box 42 is driven by a flywheel 44, which in turn is connected via a drive shaft 46 with the power take-off (PTO) coupler 48. The PTO coupler 48 is detachably connected with the PTO spline at the rear of the traction unit, such as a tractor (not shown). PTO coupler 48, drive shaft 46 and flywheel 44 together define a portion of a driveline 50 which provides rotative power to gearbox 42. Flywheel 44 has a sufficient mass to carry plunger 30 through a compression stroke as power is applied to drive shaft 46 by the traction unit. Without the flywheel, a large mechanical load (impulse) is placed on the traction unit as peak power is required by the baler during operation, such as at the end of a compression stroke and/or during a stuffer unit stroke. Generally speaking, as balers become increasingly larger the size of the flywheel also becomes increasingly larger. A larger flywheel also in turn typically requires the use of a traction unit with a higher horsepower rating, to maintain input power to the drive shaft 46 during operation, and since higher power is required to start rotation of the flywheel from an at-rest position.

Figure 2:
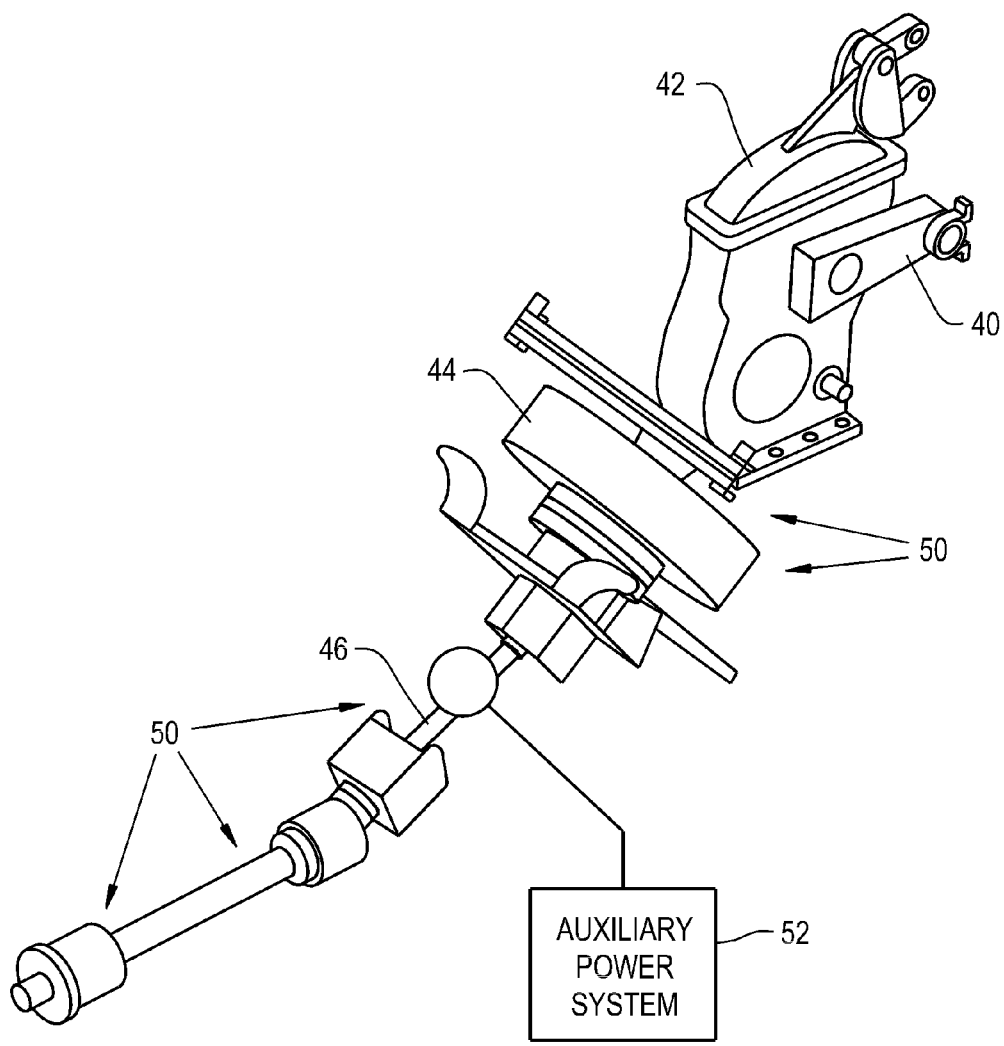
FIG. 2 is a perspective view of the driveline, gearbox and APS shown in FIG. 1.
Figure 3:
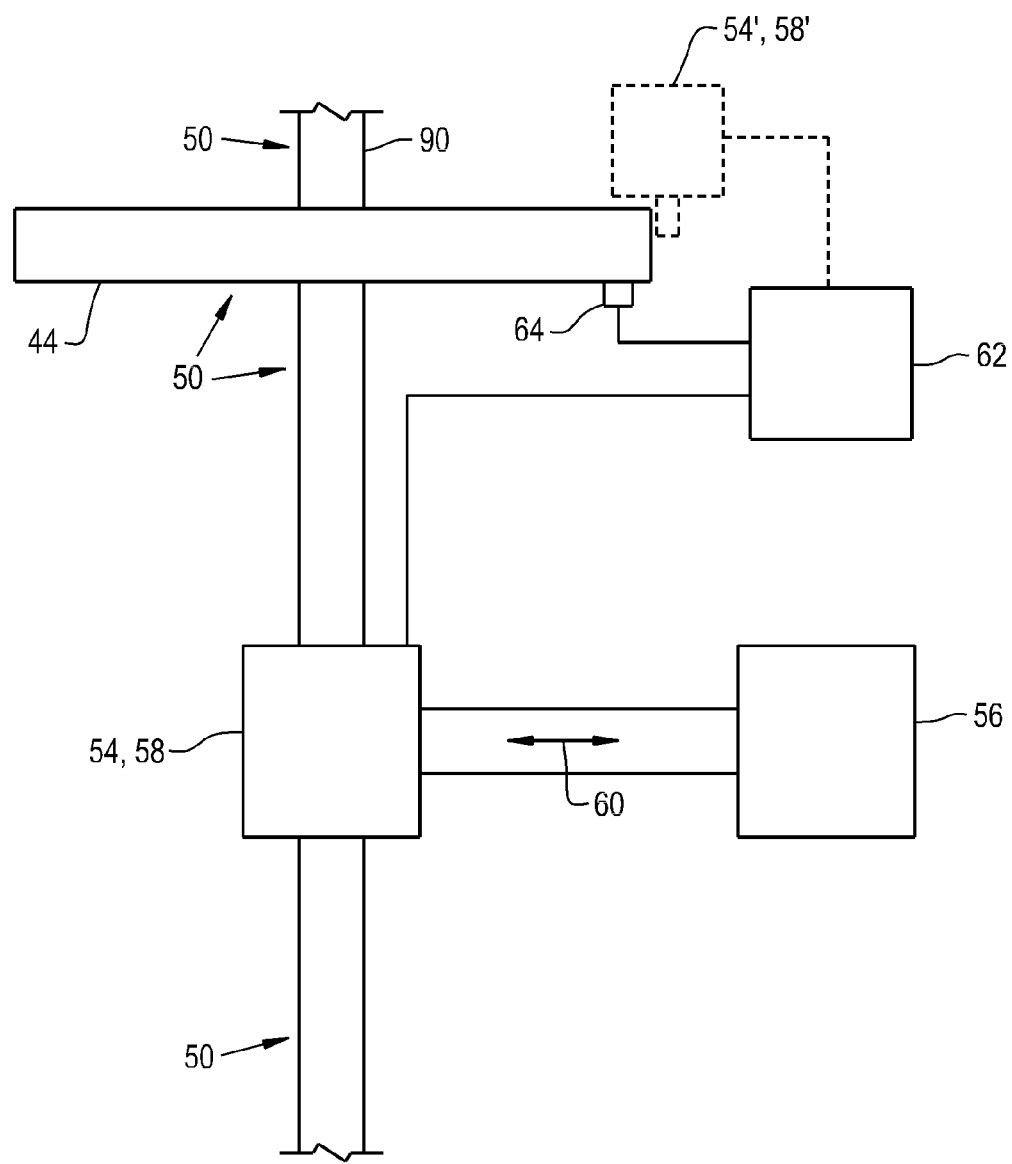
FIG. 3 is a block diagram showing a simplified embodiment of the APS of the present invention.

Referring now to FIGS. 1-3, conjunctively, baler 10 also includes an auxiliary power system (APS) 52 which is coupled with the driveline 50 in parallel with the flywheel 44 and gearbox 42, and generally functions to receive power from the driveline 50, store the power, and transmit the stored power back to the driveline 50. APS 52 generally includes a power generation device 54 for receiving power from the driveline 50 and generating power, a power storage device 56 coupled with and storing power from the power generation device 54, and a power feedback device 58 for transmitting the stored power back to the driveline. The power generation device 54 and the power feedback device 58 are each generically referred to separately or together as a "power device", since they each transfer power, depending upon how the APS 52 is configured. For example, in the block diagram shown in FIG. 3, the power generation device 54 and the power feedback device 58 are configured as the same unit which can operate with different functionality, such as a hydraulic pump/motor or an electric motor/generator. When configured as a hydraulic pump/motor, the power storage device 56 can be in the form of one or more hydraulic accumulators. Alternatively, when configured as an electric motor/generator, the power storage device 56 can be in the form of one or more ultracapacitors and/or batteries. With this type of dual functionality, the power storage device 56 is connected with the power generation device 54/power feedback device 58 in a bidirectional manner allowing 2-way flow of power, as indicated by double headed arrow 60.

Alternatively, the power generation device 54 and the power feedback device 58 can be separate and discrete units which are each coupled with the driveline 50 and power storage device 56. For example, the power generation device 54 can be in the form of a hydraulic pump, and the power feedback device 58 can be in the form of a separate hydraulic motor, each of which are mechanically coupled with the driveline 50 and hydraulically coupled with a power storage device in the form of an accumulator (not specifically shown). Moreover, the power generation device 54 can be in the form of an electric motor, and the power feedback device 58 can be in the form of a separate electric generator, each of which are mechanically coupled with the driveline 50 and electrically coupled with a power storage device 56 in the form of an ultracapacitor and/or battery (not specifically shown).

The power storage device 56 shown in FIG. 3 can also be configured differently than one or more hydraulic accumulators, ultracapacitors and/or batteries. For example, the power storage device 56 can be configured as an additional mechanical flywheel which receives/transmits power from/to the driveline 50. The power generation device 54 and the power feedback device 58 can be configured as a continuously variable transmission (CVT), and the additional flywheel would somehow be capable of receiving and storing power during off-peak load periods and transferring the power back to the driveline 50 for use during peak load periods.

For purposes of discussion hereinafter, it will be assumed that the power generation device 54 and the power feedback device 58 are in the form of a singular unit configured as a hydraulic pump/motor. Pump/motor 54, 58 is coupled with and under the control of an electrical processing circuit 62, which can be in the form of an electronic control unit (ECU) or an analog processor. Electrical processing circuit 62 can be a dedicated ECU onboard baler 10, or can also be part of an ECU used for other purposes onboard baler 10. Alternatively, electrical processing circuit 62 can also be an ECU onboard the traction unit which tows the baler 10, and can be coupled with the pump/motor 54, 58 and other components onboard baler 10 in a wired or wireless manner.

Electrical processing circuit 62 controls operation of pump/motor 54, 58 in a manner such that power is transmitted to the driveline 50 prior to and during peak load periods on the baler 10, and power is received from the driveline 50 during off-peak load periods on the baler 10. More specifically, power is transmitted to/from the driveline 50 dependent upon one or more power indicators which each provide an output signal representing a parameter associated with power usage during the compression cycle of the plunger 30. The power indicator(s) generally provide(s) an output signal representative of a parameter associated with the duty cycle of plunger 30, and more specifically provides an output signal representative of a parameter associated with the plunger 30 within the main bale chamber 26, and/or a parameter associated with the formation of a slice of crop material within the bale chamber 26.

To this end, the electrical processing circuit 62 is connected with one or more power indicators in the form of sensors 64 which provide output signals indicative of the position of the plunger 30 and/or a crop slice formation variable. Examples of sensed parameters associated with the plunger can include: a load on the plunger (such as by, e.g., using a strain gauge on the plunger 30 or a torque sensor in the gearbox 42); a position of the plunger; a speed of the flywheel; a position of the flywheel; and/or a position of a crankarm attached to the plunger. In the embodiment shown in FIG. 3, the sensor 64 is positioned adjacent to flywheel 44 to determine the rotational position of the flywheel 44, such as by using a proximity sensor, optical sensor, etc. The position of the flywheel 44 can in turn be used to establish the position of the plunger 30 within the main bale chamber 26. Alternatively, the sensor 64 can be configured to sense a variable associated with crop slice formation within the main bale chamber 26. Examples of crop slice formation variables may include a moisture content of the crop material, a thickness of a given slice of crop material and/or a positional change of the plunger at maximum compression for each slice of the crop material. Alternatively, the variable associated with the crop slice formation can even be input by a user, such as a particular type of crop material being harvested. Other input variables may also be used for controlling operation of APS 52.

Figure 4:
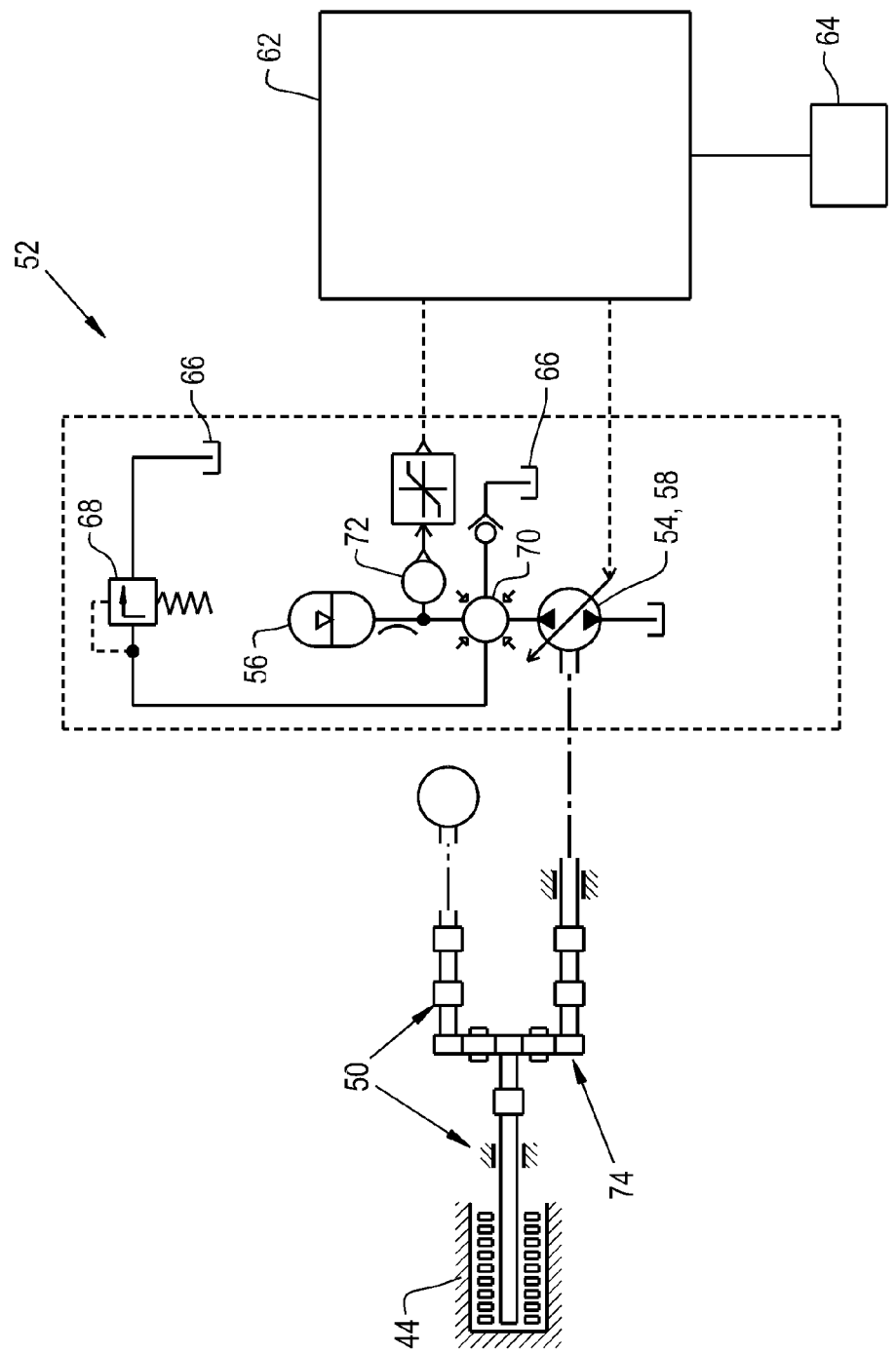
FIG. 4 is a control schematic of an embodiment of the APS of the present invention.
Figure 5:
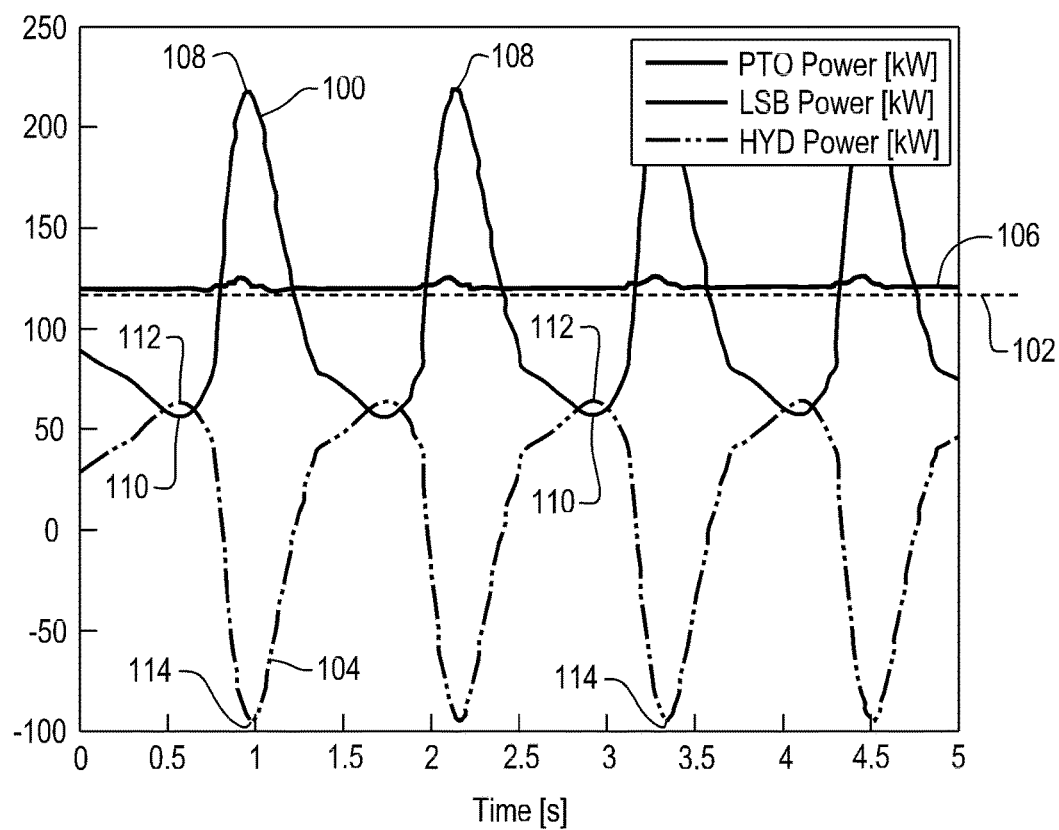
FIG. 5 is a graphical illustration of required power during compression cycles of the baler, hydraulic power input by the APS, and resultant PTO power as a result of the power input by the APS.

Referring now to FIG. 4, there is shown a control schematic of the APS 52 shown in FIGS. 1-3. APS 52 can be thought of as defining a hydraulic flywheel which is based on an over-center variable displacement pump/motor 54, 58 connected between the accumulator 56 and a tank 66. In order to avoid any overpressure, a pressure relief valve 68 is installed between the pump/motor 54, 58 and the accumulator 56. A check valve 70 is also connected to the tank 66 in order to avoid cavitation of the pump/motor 54, 58. A pressure transducer 72 is used to manage the displacement of the pump/motor 54, 58. Basically, during a typical duty cycle, the pump/motor 54, 58 works as a real pump charging the accumulator 56 when the instant power of the baler 10 is lower than the average power (FIG. 5). On the other hand, when the plunger 30 is in a compressing stroke, the pump/motor 54, 58 works as a motor converting hydraulic power into mechanical power that can be provided to the driveline 50. In this way, the typical peak power can be avoided and the PTO power provided from the tractor is always close to the average power. The pump size is a function of the maximum pressure in the accumulator 56 and the operating speed of the pump/motor 54, 58. Because of the additional gearbox 74 coupled with the driveline 50, the pump speed can be increased, e.g., from 1000 RPM (the typical PTO speed during working conditions) up to approximately 2680 RPM. This higher speed allows the use of a smaller pump with a higher hydraulic efficiency and faster response time, in contrast with a larger pump needed when operating at a lower speed condition.

In the embodiment of APS 52 described above, the system is assumed to be a hydraulic system with a pump/motor 54, 58 connected between the PTO coupler 48 and the flywheel 44. However, the exact location of the connection between the APS 52 and the driveline 50 can vary. For example, referring to FIG. 3, a pump/motor 54', 58' (shown in dashed lines as an optional attachment location) can also engage splines or gear teeth (not shown) formed at the periphery of flywheel 44. As a further example, a pump/motor can be connected with an input shaft 90 of gearbox 42. Thus, it is apparent that wherever power can be scavenged along the length of driveline 50, APS 52 can be coupled with the driveline 50 for transmitting power to/from the driveline 50, in a manner as described above.

During operation of the baler 10, the plunger 30 reciprocates back and forth during compression cycles within the main bale chamber 26. In the embodiment of the large square baler shown in the graph of FIG. 5, as the plunger 30 reciprocates back and forth (indicated by the top generally sinusoidal curve 100), the power required at the PTO shaft of the large baler can fluctuate between a minimum power requirement up to approximately four times the minimum power requirement (e.g., between approximately 55 and 215 kW). However, the average power indicated by the horizontal dashed line 102 is only about two times the minimum power requirement (e.g., 107 kW). On the other hand, the power provided by the hydraulic pump/motor 54, 58 to the driveline 50 (indicated by the bottom generally sinusoidal curve 104) generally offsets the power fluctuations required at the PTO shaft. Thus, the resultant power required at the PTO shaft is indicated by the generally horizontal line 106 just above the average power line 102.

More particularly, the top curve 100 representing the power requirement of the baler 10 has a duty cycle with a period from one cycle to the next of slightly greater than 1 second. The duty cycle has a maximum power requirement at each point 108 of approximately 215 kW which occurs at an end of each compression stroke, a minimum power requirement at each point 110 of approximately 55 kW which occurs at an end of each return stroke, and an overall amplitude of 160 kW (215 kW-55 kW).

Likewise, the APS 52 has a power output curve represented by the bottom curve 104 which is generally a mirror image of the top curve 100 representing the duty cycle of the baler 10. In this manner, the APS 52 is configured for transmitting power to the driveline 50 to offset the duty cycle of the plunger 30 and thereby establish a substantially constant power requirement represented by line 106. The power output curve of APS 52 has a period from one cycle to the next of slightly greater than 1 second. For values on the vertical axis above zero (0) the APS 52 is receiving power from the driveline 50, and for values on the vertical axis below zero (0) the APS 52 is transferring power back to the driveline 50. The power output curve has a maximum value at each point 112 of approximately 58 kW which occurs at an end of each return stroke, a minimum value at each point 114 of approximately −98 kW which occurs at an end of each compression stroke, and an overall amplitude of 156 kW (58 kW−(−98 kW)). The APS 52 thus has a power output curve 104 with a total amplitude which is approximately the same as a total amplitude of the curve 100 representing the duty cycle of the baler 10.

As can be seen in FIG. 5, the power output curve 104 crosses over from positive to negative values, or vice versa, when the duty cycle curve 100 crosses over the average power requirement line 102. The power generation device 54 receives power from the driveline 50 and generates power during a portion of the return and compression strokes when an actual power requirement (i.e., position on the duty cycle curve 100) is below the average power requirement line 102. The power feedback device 58 transmits the stored power back to the driveline 50 when an actual power requirement during the duty cycle line 100 is above the average power requirement line 102. Power transmission to the driveline 50 occurs during an end portion of the compression stroke and a beginning portion of the return stroke, including a predetermined portion of the compression stroke prior to a peak load on the plunger 30. The power feedback device 58 transmits power back to the driveline 50 at a maximum feedback level corresponding to point 114 when the duty cycle is at the maximum power requirement value 108. When configured as a common or singular unit 54, 58, the common unit can selectively function either as the power generation device 54 or the power feedback device 58, when the duty cycle curve 100 crosses over the average power requirement line 102.

The resultant substantially constant power requirement curve 106 at the driveline 50 can be a predetermined value which is approximately equal to or slightly above the average power requirement line 102. The power requirement curve 106 can have slight fluctuations, such as shown corresponding to the peak power requirement value 108 of the duty cycle curve 100, but in general is a substantially constant value requiring a known power input from the base unit attached to the driveline 50.

Figure 6:
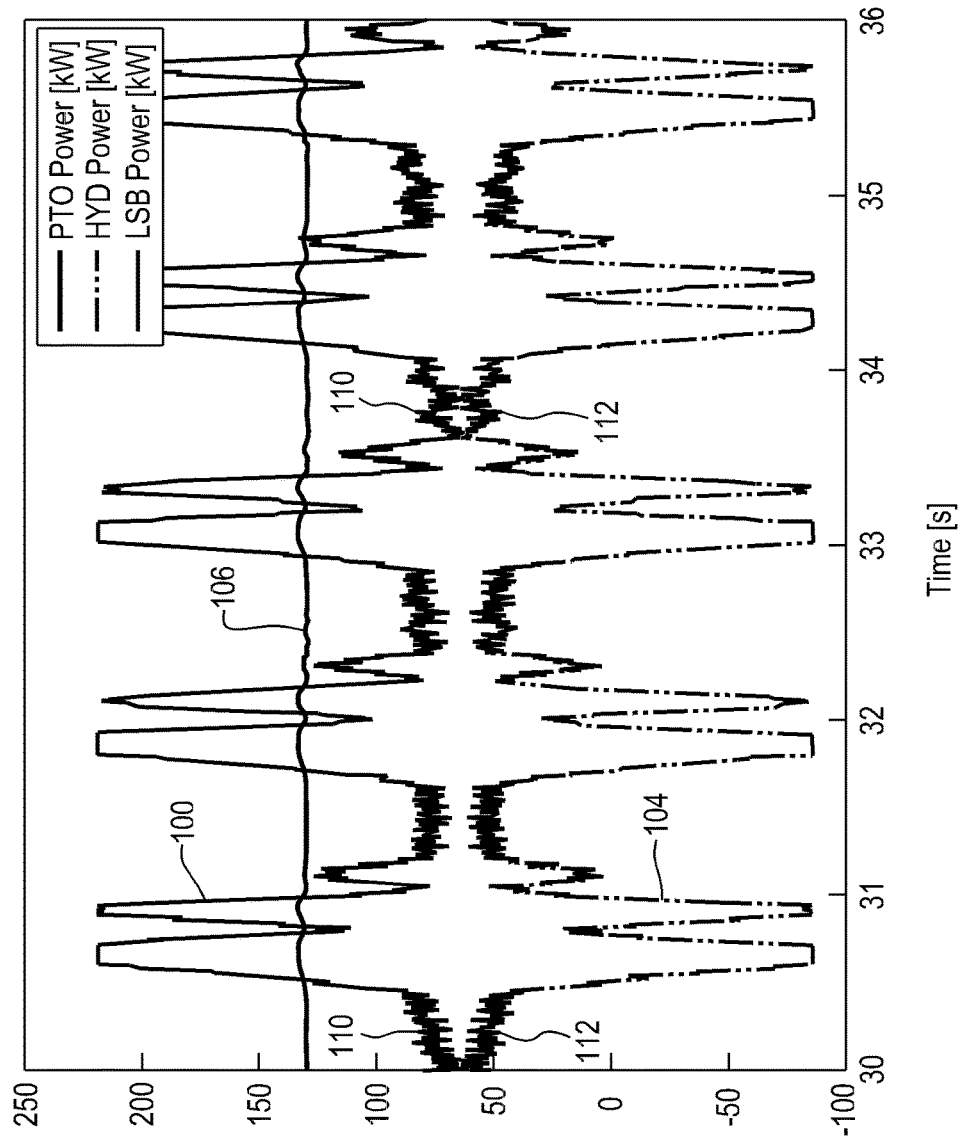
FIG. 6 is a graphical illustration of another embodiment of the required power during compression cycles of the baler, hydraulic power input by the APS, and resultant PTO power as a result of the power input by the APS.

As is apparent in FIG. 5, the APS power output curve 104 and the duty cycle curve 100 can overlap slightly between the minimum power output 110 of the duty cycle and the maximum value 112 of the APS output curve 104. Thus, when the duty cycle curve 100 is at the minimum power requirement value 110, the APS 52 is receiving power from the driveline 50 at a value 112 which is slightly above the minimum power requirement value 110. Alternatively, as shown in FIG. 6, the APS power output curve 104 and the duty cycle curve 100 can lie adjacent to each other without overlapping, and meet between the minimum power output 110 of the duty cycle and the maximum value 112 of the APS power output curve 104.

The power output from the APS 52 of course is dependent on the selected size of the power feedback device 58. In one embodiment, the plunger 30 has a maximum power requirement of about 215 kW when the plunger 30 is at the end of the compression stroke, and an average power requirement of about 107 kW over the duty cycle of the plunger 30. With the power generation device/power feedback device configured as a hydraulic pump/motor 54, 58, and the power storage device configured as a hydraulic accumulator, the APS 52 can be configured as follows:

Overcenter pump A10VOS
    Pump displacement=140 cc
    Accumulator volume=10 liters
    Accumulator gas pre-charge=100 bar
    Pressure relief valve=350 bar
    Gearbox ratio (gearing up the rotational speed into the pump)=2.68
    Tank volume=15 liters.

This configuration provides a satisfactory output power to the driveline 50 which results in a required power at the driveline which is generally constant and slightly above the average power requirement of the plunger duty cycle. Of course, many configurations are possible, dependent on a number of input criteria such as plunger size, flywheel size, target average power requirement, etc.

According to another aspect of the present invention, operation of the APS 52 is carried out using a feedforward control algorithm. With conventional closed loop control systems, the electronic components can operate at a high speed and are fast enough to enable adjustment of the system "on the fly". However, with the APS 52 of the present invention, one or more of the mechanical components (such as the pump 54) may not be able to adjust fast enough to allow adjustment of the system on the fly. In this case, an expensive pump with fast reaction times would be required, which is expensive and not desirable. Using a feedforward control system, a lesser expensive pump with a slower response time can be used and adjusted on a less time sensitive basis based on previous duty cycles of the plunger 30.

An example of a feedforward control algorithm which may be used with the APS 52 of the present invention will now be described hereinafter. It is to be understood that other feedforward control algorithms can also be used to control operation of the APS 52.

Starting from the basic equation (torques refer to torques at the flywheel):

$$J_{FW}\dot{\omega}_{PTO} = T_e + T_p(\theta)$$

A control target is to get the engine torque at the PTO shaft Te as constant as possible and the PTO shaft speed constant. Let:

$$T_p(\theta) = \overline{T}_p + \Delta T_p(\theta)$$

$$T_e = \overline{T}_e + \Delta T_e$$

where the upper bar denotes the average value in a plunger cycle. The basic equation can be rewritten as:

$$T_{PH}\dot{\omega}_{PTO} = \overline{T}_e + \Delta T_e + T_h - \overline{T}_p - \Delta T_p(\theta)$$

Taking into account the target, the left term of the above equation is zero if:

$$T_e = T_p$$

$$T_h = \Delta T_p(\theta)$$

$$\Delta T_e = 0$$

So if $T_h = \Delta T_p(\theta)$ it is possible to have Te constant with the value $\overline{T}_e = \overline{T}_p$.

Figure 7:
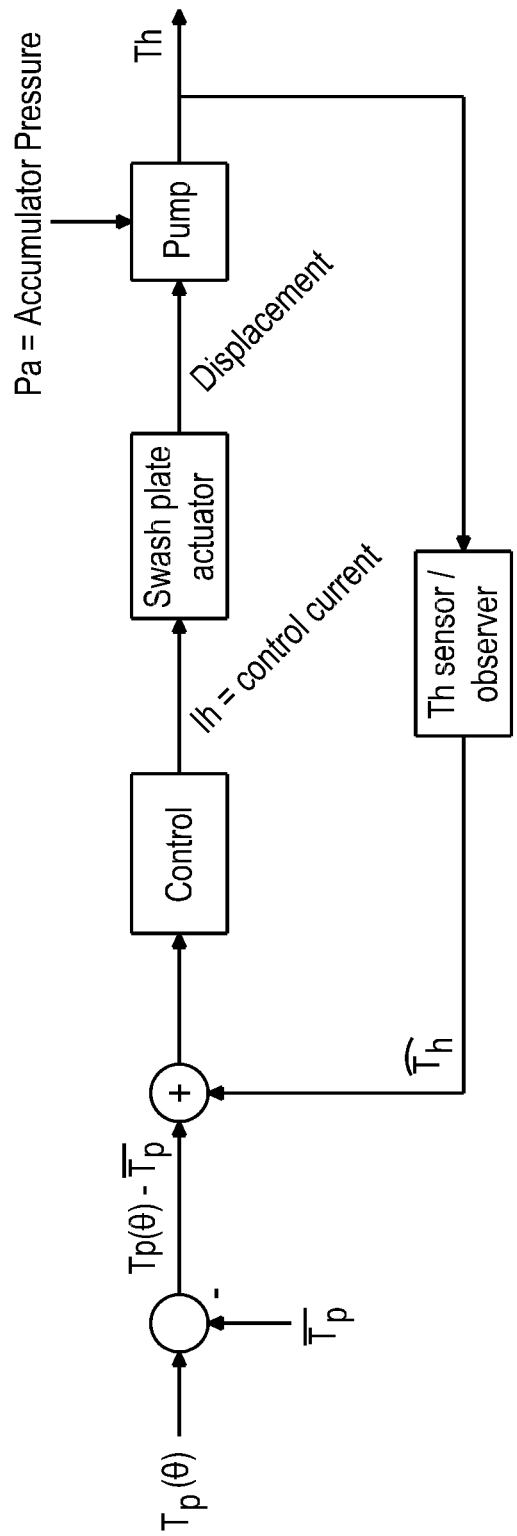
FIGS. 7-9 are control schematics corresponding to a feedforward control which can be used with the APS of the present invention.

FIG. 6 illustrates an ideal result achievable with a closed loop control system (shown by line 106) when $T_p(\theta)$ is measured, $\overline{T}_p$ is known in advance, and the hybrid device (e.g., hydraulic pump 54) is fast enough. The corresponding control scheme is shown in FIG. 7.

There are two main problems to achieve the ideal result shown in FIG. 6:

1. due to crop variations it is not possible to know $\overline{T}_p$ in advance; and
2. the hybrid device may not be fast enough.

To cope with both problems above, a predictive control scheme based on previous cycles is proposed. To that end, let:

$$\Delta T_p(n) = \Delta T_p(\theta) \text{ measured at plunger cycle n}$$

$$\overline{T}_p(n) = \overline{T}_p \text{ measured at plunger cycle n}$$

The values at cycle n (or a proper average of a number of past cycles) will be used as a feed forward action in the control system. This functions correctly because in normal operating conditions:

$$\Delta T_p(n) \approx \Delta T_p(n-1)$$

$$\overline{T}_p(n) \approx \overline{T}_p(n-1)$$

The feed forward value of the hybrid device assistance is set as:

$$T_{hffd}(n+1) = \Delta T_p(n)$$

If the crop conditions are approximately uniform, the engine will have to supply a torque that will result to be approximately constant at the value:

$$T_e \approx \overline{T}_p(n) \approx \overline{T}_p(n-1)$$

Figure 8:
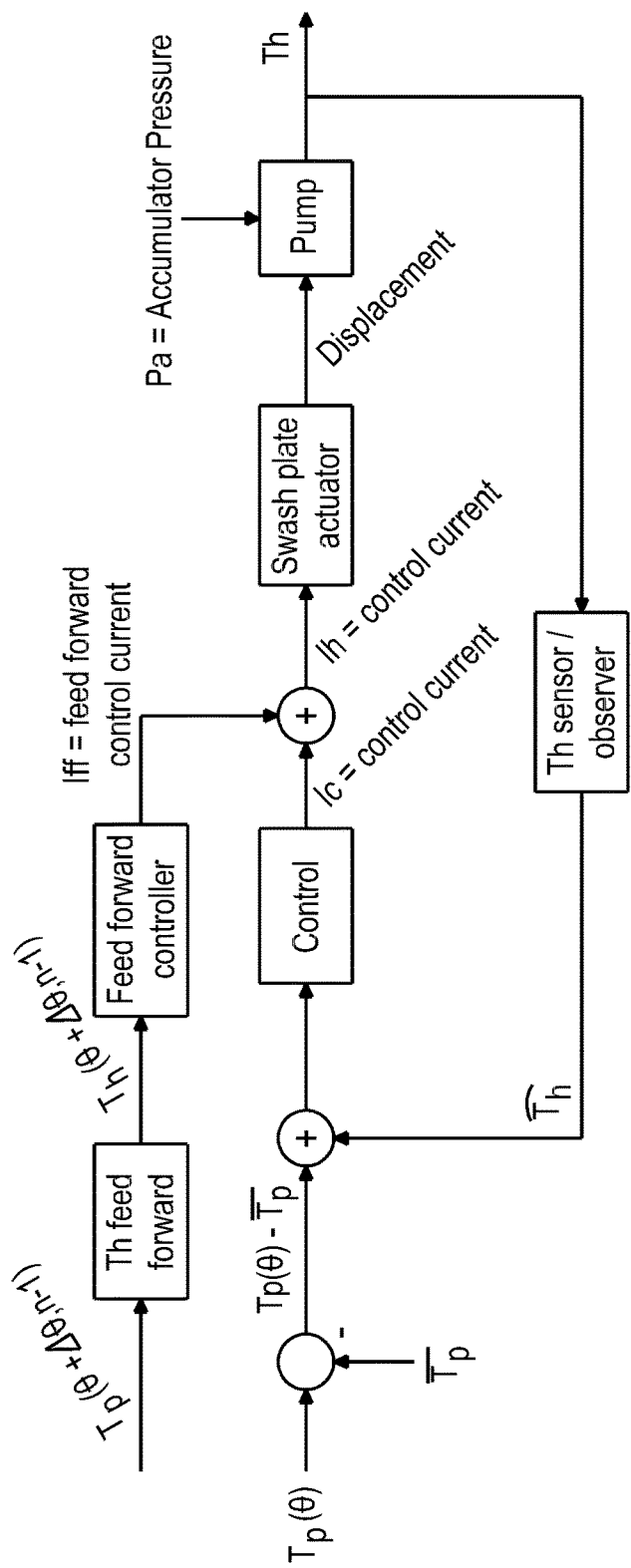

The proposed control scheme is represented in FIG. 8. In FIG. 8, $T_p(\theta+\Delta\theta, n-1)$ is the information coming from the previous cycle(s) that is fed forward in the closed loop control. $\Delta\theta$ is the advance above $\theta$ to compensate for the actuator response speed. All of the above approach can be easily adapted to take into account the stuffer operations (e.g., not in all plunger cycles the crop is fed into the baler chamber).

The key element in the control system above is the "feed forward controller". The feed forward control current 1ff takes into account the dynamic of the pump and knows in advance what can happen (based on previous cycles) so the current 1ff has the following property: if the current cycle was equal to the previous one, the control current Ic would be zero and the torque Th would be exactly equal to its target value $T_p(\theta) - \overline{T}_p$. The differences between the current cycle and the previous cycle are compensated by the feedback control (box "control").

Figure 9:
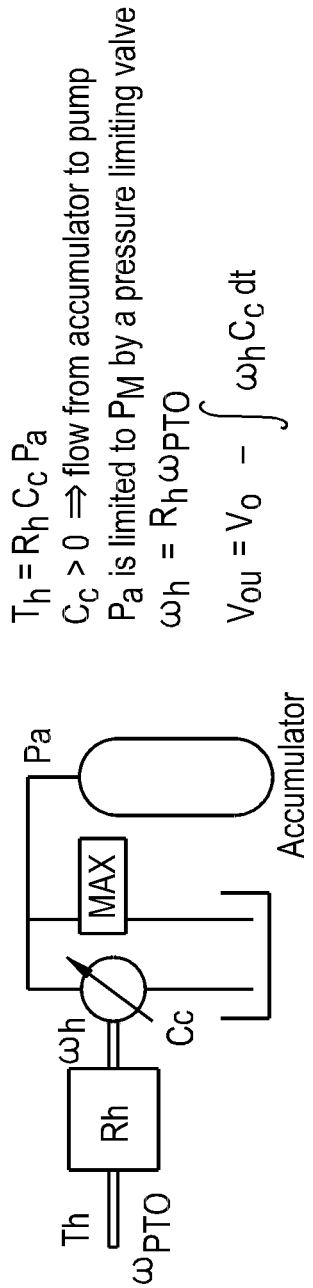

FIG. 9 shows a control schematic for controlling the displacement Cc in order to get Th. Pa depends on the volume of oil stored in the accumulator, this oil volume Voil is the integral of the volume oil flow. The oil flow depends on the displacement Cc and on the pump rotational speed. The pressure Pa is a function fa of the stored volume, therefore:

$$T_h = R_h C_c [f_a(V_o - \int \omega_h C_c dt)]$$

The equation $$T_h = R_h C_c [f_a(V_o - \int \omega_h C_c dt)]$$

can be numerically solved (e.g. during the previous cycle), the problem is to know upfront what is the initial oil volume Vo. The present invention controls the pump so that every cycle is started with the same (or a known) initial condition Vo. The easier initial condition is Pa=Pmax, since Pmax can easily be achieved by exploiting the pressure limiting valve. In this case the equation to be numerically solved is:

$$T_h = R_h C_c [P_M - f_A(\int \omega_h C_c dt)]$$

The above equation may be solved a priory for many different conditions, so a "look-up-table" approach can be used to reduce the computational effort.

Figure 10:
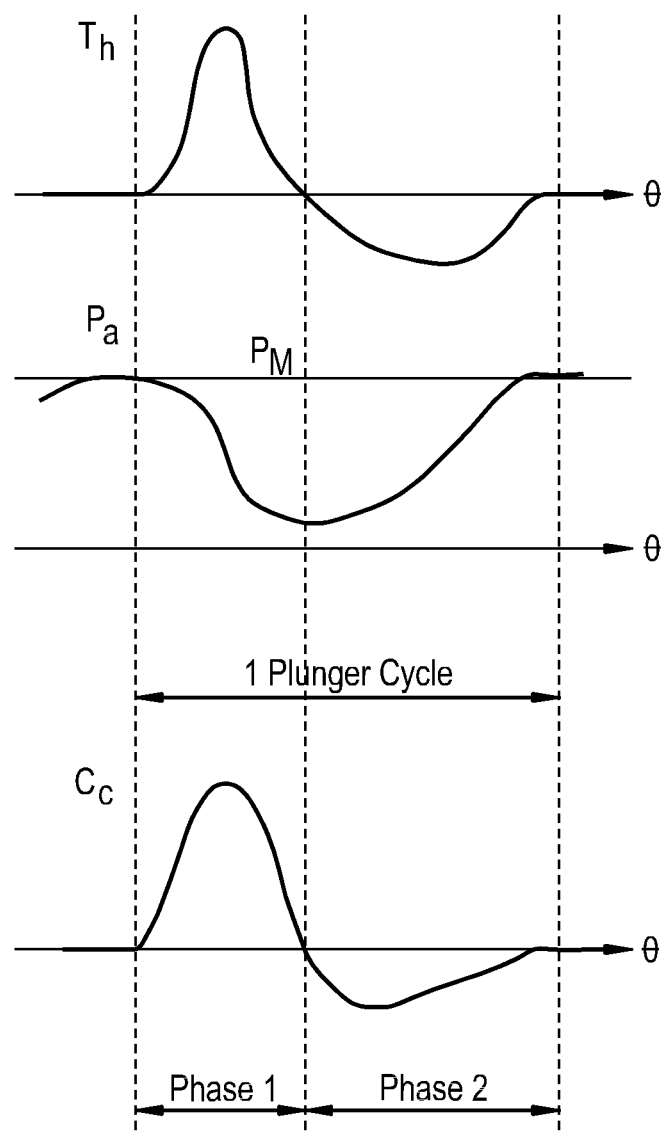
FIG. 10 is a graphical illustration showing phases of a plunger cycle.

Referring now to FIG. 10, a torque boost delivery phase and an accumulator recharge phase will be described.

Phase 1: torque boost delivery–The known initial pressure in the accumulator is Pm. Thanks to the numerical integration of the immediately preceding equation, Cc is known a priori and the feed forward control is possible.

Phase 2: accumulator recharge–When phase 1 ends (e.g., when Cc reaches zero), the displacement Cc is controlled to recharge the accumulator up to the pressure Pm before the next plunger cycle.

The pressure limiting valve allows for compensation for some errors, since it keeps the pressure to the maximum value independently from the pump displacement <0. As soon as the pressure reaches the value PM' the pump displacement is controlled to zero. The system is then ready for the next plunger cycle.

In the case of a mechanically driven pump, the problem of the pump speed is solved, but in order to control the amplitude of the torque boost, a controlled limiting valve can be used (the higher is the initial pressure, the higher the torque boost with the same Cc).

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural baler, comprising:
   a main bale chamber;
   a plunger reciprocally movable within the main bale chamber through a compression stroke and a return stroke, the plunger having a duty cycle with a maximum power requirement, a minimum power requirement, and an average power requirement over the duty cycle;
   a flywheel associated with the movement of the plunger;
   a driveline associated with the flywheel and couplable with a power take-off (PTO) of a traction unit; and
   an auxiliary power system coupled with the driveline, the auxiliary power system including:

a power indicator providing a plurality of output signals, each output signal representing a parameter associated with power usage during the duty cycle of the plunger;

a power device for receiving power from or transferring power to the driveline; and an electrical processing circuit coupled with the power indicator and the power device, the electrical processing circuit configured for receiving each of the plurality of output signals and controlling operation of the power device based at least one output signal from at least one previous duty cycle.

2. The agricultural baler of claim 1, wherein the electrical processing circuit uses a feedforward control algorithm to optimize power requirements of the baler.

3. The agricultural baler of claim 2, wherein the electrical processing circuit uses a closed loop, feedforward control algorithm to optimize power requirements of the baler.

4. The agricultural baler of claim 2, wherein the power device includes a pump, and the electrical processing circuit controls operation of the pump for a current duty cycle, based on the at least one output signal.

5. The agricultural baler of claim 1, wherein the power indicator includes at least one sensor operable for sensing a parameter associated with the duty cycle.

6. The agricultural baler of claim 5, wherein the at least one sensor is operable for sensing:
a load on the plunger;
a position of the plunger;
a speed of the flywheel;
a position of the flywheel; or
a position of a crankarm attached to the plunger.

7. The agricultural baler of claim 5, wherein the electrical processing circuit is further configured for controlling operation of the power device to receive power from the driveline and generate power, dependent upon the plurality of output signals.

8. The agricultural baler of claim 7, further comprising a power storage device coupled with and storing power from the power device.

9. The agricultural baler of claim 8, wherein the electrical processing circuit is further configured for controlling operation of the power device to transmit power back to the driveline, dependent upon the plurality of output signals.

10. The agricultural baler of claim 9, wherein the auxiliary power system is configured for transmitting power to the driveline for a portion of the compression stroke prior to a peak load on the plunger.

11. The agricultural baler of claim 1, wherein the auxiliary power system is configured for receiving power from the driveline, storing the power, and transmitting the stored power back to the driveline.

12. The agricultural baler of claim 11, wherein the power device includes a power generation device for receiving power from the driveline and generating power, and a power feedback device for transmitting power back to the driveline, and further including a power storage device for storing the generated power.

13. The agricultural baler of claim 12, wherein the power storage device includes a hydraulic accumulator, and wherein the power generation device includes a hydraulic machine working as a hydraulic pump coupled with the hydraulic accumulator, and the power feedback device is derived by the hydraulic machine working as a motor when transmitting the stored power back to the driveline from the hydraulic accumulator.

14. The agricultural baler of claim 12, wherein the power storage device includes a capacitor or a battery, and wherein the power generation device includes an electric machine functioning as an electric motor and the power feedback device is derived by the electric machine functioning as an electric generator when transmitting the stored power back to the driveline.

15. A method of operating an agricultural baler, the baler including a main bale chamber, a plunger, a flywheel associated with movement of the plunger, and a driveline associated with the flywheel and couplable with a power take-off (PTO) of a traction unit, the method comprising the steps of:
reciprocally moving the plunger within the main bale chamber through a compression stroke and a return stroke, the plunger having a duty cycle with a maximum power requirement, a minimum power requirement, and an average power requirement over the duty cycle;
sensing a parameter associated with power usage of the baler during the duty cycle of the plunger; and
controlling operation of a power device using an auxiliary power system coupled with the driveline, based on a sensed parameter from at least one previous duty cycle, to thereby receive power from or transfer power to the driveline using the power device.

16. The method of claim 15, wherein the auxiliary power system uses a feedforward control algorithm to optimize power requirements of the baler.

17. The method of claim 15, wherein the power device includes a power generation device for receiving power from the driveline and generating power, and a power feedback device for transmitting power back to the driveline, and further including a power storage device for storing the generated power.

* * * * *